(12) United States Patent  
Yamazaki

(10) Patent No.: US 8,014,679 B2
(45) Date of Patent: Sep. 6, 2011

(54) OPTICAL SPACE TRANSMISSION DEVICE INCLUDING ROTATABLE MEMBER

(75) Inventor: Tomohiro Yamazaki, Kyoto (JP)

(73) Assignee: Rohm Co., Ltd. (JP)

( * ) Notice: Subject to any disclaimer, the term of this patent is extended or adjusted under 35 U.S.C. 154(b) by 676 days.

(21) Appl. No.: 12/028,130

(22) Filed: Feb. 8, 2008

(65) Prior Publication Data

US 2008/0219674 A1    Sep. 11, 2008

(30) Foreign Application Priority Data

Feb. 8, 2007    (JP) ................................ P2007-029181

(51) Int. Cl.
*H04B 10/00* (2006.01)

(52) U.S. Cl. ........ 398/135; 398/114; 398/107; 398/113; 398/128; 398/136

(58) Field of Classification Search .................. 398/114, 398/107, 113, 128, 130, 135, 136
See application file for complete search history.

(56) References Cited

U.S. PATENT DOCUMENTS

| | | | | |
|---|---|---|---|---|
| 5,949,565 A | * | 9/1999 | Ishida | 398/131 |
| 2003/0231394 A1 | * | 12/2003 | Kimura | 359/558 |
| 2006/0044406 A1 | * | 3/2006 | Swarr et al. | 348/211.1 |
| 2007/0065158 A1 | * | 3/2007 | Shindou et al. | 398/164 |

FOREIGN PATENT DOCUMENTS

| | | |
|---|---|---|
| JP | 62-32658 B2 | 7/1987 |
| JP | 11-41301 A | 2/1999 |
| JP | 2000-83181 A | 3/2000 |
| JP | 2001-320331 A | 11/2001 |
| JP | 2007-088939 A | 4/2007 |

OTHER PUBLICATIONS

Japanese Office Action for Japanese Patent Application No. 2007-029181, Notice of Reason for Refusal dispatched Jun. 28, 2011.

* cited by examiner

*Primary Examiner* — Dalzid Singh
(74) *Attorney, Agent, or Firm* — Cantor Colburn LLP

(57) ABSTRACT

An optical space transmission device includes: a first portion; and a second portion which is rotatably connected to the first portion and performs space transmission of signals using light between the first portion and the second portion. The device includes: a first light emitting and receiving module which is provided for the first portion and includes: a first light emitting element composed of a light emitting diode emitting first signal light modulated based on a signal transmitted from the first to second portion; and a first light receiving element receiving second signal light modulated based on a signal transmitted from the second to first portions; and a second light emitting and receiving module which is provided for the second portion and includes: a second light emitting element composed of a semiconductor laser emitting the second signal light; and a second light receiving element receiving the first signal light.

16 Claims, 3 Drawing Sheets

CENTRAL AXIS OF ROTATION

CENTRAL AXIS OF ROTATION

OPTICAL SPACE TRANSMISSION DEVICE INCLUDING ROTATABLE MEMBER

CROSS REFERENCE TO RELATED APPLICATION AND INCORPORATION BY REFERENCE

This application is based upon and claims the benefit of priority from prior Japanese Patent Application P2007-029181 filed on Feb. 8, 2007; the entire contents of which are incorporated by reference herein.

BACKGROUND OF THE INVENTION

1. Field of the Invention

The present invention relates to an optical space transmission device performing space transmission of signals using light. More specifically, the present invention relates to an optical space transmission device suitable for use in an application performing wireless signal transmission within a device which includes a rotation mechanism such as a monitoring camera.

2. Description of the Related Art

In a conventional device including a rotation mechanism, for example such as a monitoring camera, generally, a fixed portion and a rotating portion are electrically connected by a slip ring, through which signals such as control and video signals are transmitted between the fixed and rotating portions as disclosed in Patent Literature 1 (Japanese Patent Laid-open Publication No. 2000-83181), for example. However, such signal transmission using the slip ring is reaching the limit of performance because various types of control signals are coming into use along with sophistication of devices and volume of data is increasing along with an improvement in image quality.

On the other hand, in recent years, techniques of space transmission of signals using light, such as short-range wireless communication using infrared rays, for example, IrDA, are dramatically advancing and are widespread as the technique to implement wireless signal transmission between devices spatially apart from each other (for example, see Patent Literature 2 (Japanese Patent Laid-open Publication No. 11-41301). Such a technique of space transmission of signals using light is thought to be effectively applied to signal transmission between the fixed and rotating portions of the device including a rotation mechanism such as a monitoring camera.

Meanwhile, the short-range infrared wireless communication such as IrDA uses a light emitting diode (LED) as a light source emitting light modulated based on transmitted signals. The limit of modulation speed of this LED often determines the upper limit of the transmission speed. Accordingly, when the aforementioned technique is directly applied to the signal transmission between the fixed and rotating portions of the monitoring camera, for example, it may be possible to achieve transmission speed high enough to transmit a control signal from the fixed portion including a controller to the rotating portion including a camera section. However, in this case, it may be not possible to achieve transmission speed high enough to transmit a video signal including data of large size from the rotating portion including the camera section to the fixed portion including the controller, and it is thought to be difficult to properly transmit the video signal.

Patent Literature 2 proposes a technique which substantially enables high speed transmission using an LED as a light source by providing a circuit which performs signal processing so that the LED emits multiple-valued signal light which varies stepwise. However, such a method requires a dedicated signal processing circuit, therefore causing an increase in costs. Moreover, it is difficult to transmit the video signal at real time.

Another example of space transmission of signals using light which is utilized in an application transmitting a video or audio signal from a video reproducer to a television without wires uses a semiconductor laser (LD) as a light source. LDs have maximum modulation speed dramatically higher than LEDs and therefore can be adequately applied to transmission of a video signal including data of large size.

However, some parts including an LD and an LD driver driving the LD for modulation of light are more expensive than LEDs and an LED driver. Accordingly, employment of this method for two-way signal transmission between the fixed and rotating portions in the monitoring camera is not efficient and increases costs. Such a problem can be caused not only in the monitoring camera but also in every device which requires two-way signal transmission between the fixed and rotating portions through the rotation mechanism and requires high-speed transmission only in one way.

SUMMARY OF THE INVENTION

The present invention was made in the light of the existing actual conditions, and an object of the present invention is to provide an optical space transmission device capable of efficiently and properly performing signal transmission between fixed and rotating portions of a device including a rotation mechanism.

An optical space transmission device includes: a first portion; and a second portion which is rotatably connected to the first portion and performs space transmission of signals using light between the first portion and the second portion. The device includes: a first light emitting and receiving module provided for the first portion and a second light emitting and receiving module provided for the second portion. The first light emitting and receiving module includes: a first light emitting element composed of a light emitting diode emitting first signal light modulated based on a signal transmitted from the first to second portion; and a first light receiving element receiving second signal light modulated based on a signal transmitted from the second to first portions. The second light emitting and receiving module includes: a second light emitting element composed of a semiconductor laser emitting the second signal light; and a second light receiving element receiving the first signal light.

According to the present invention, signal transmission from the first to second portions of the device uses a light emitting diode as a light source of signal light while signal transmission from the second to first portions uses a semiconductor laser as a light source of signal light. It is therefore possible to perform efficiently and properly two-way signal transmission between the first and second portions in the device requiring high speed transmission only in one way.

DETAILED DESCRIPTION OF THE INVENTION

Figure 1:
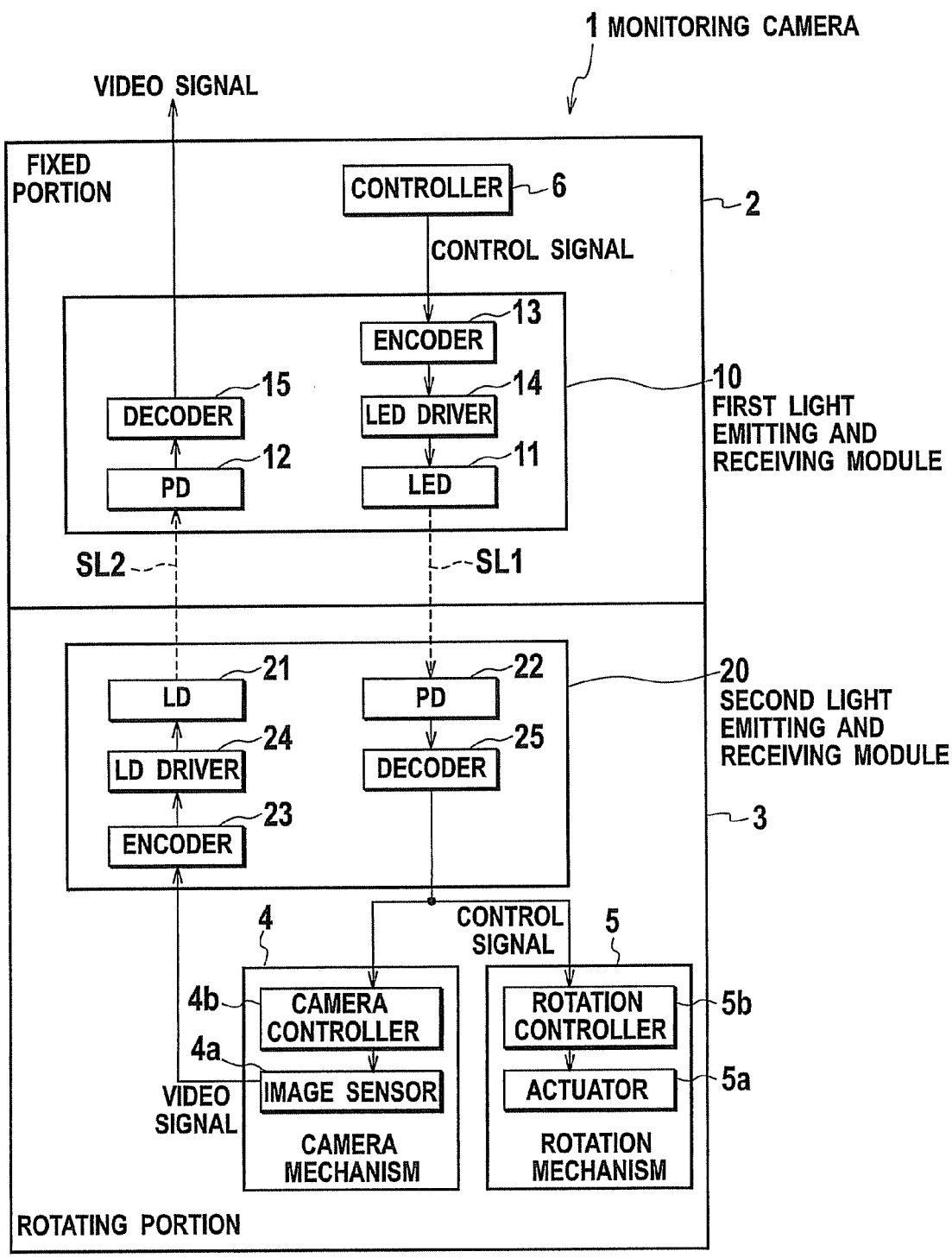
FIG. 1 is a block diagram showing a schematic configuration of a monitoring camera including an optical space transmission device according to an embodiment.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

Hereinafter, with reference to the drawings, a description is given of an embodiment of the present invention. The embodiment is an application example as an optical space transmission device which performs two-way space transmission of signals using light between fixed and rotating portions of a monitoring camera.

Figure 2A:
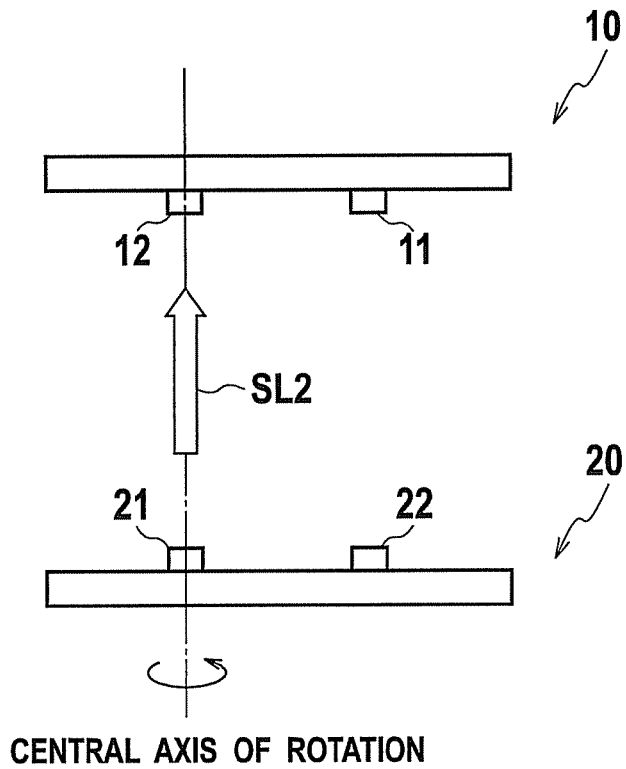
FIGS. 2A and 2B are side views for explaining a relative positional relationship between a first light emitting and receiving module and a second light emitting and receiving module constituting the optical space transmission device according to the embodiment.
Figure 2B:
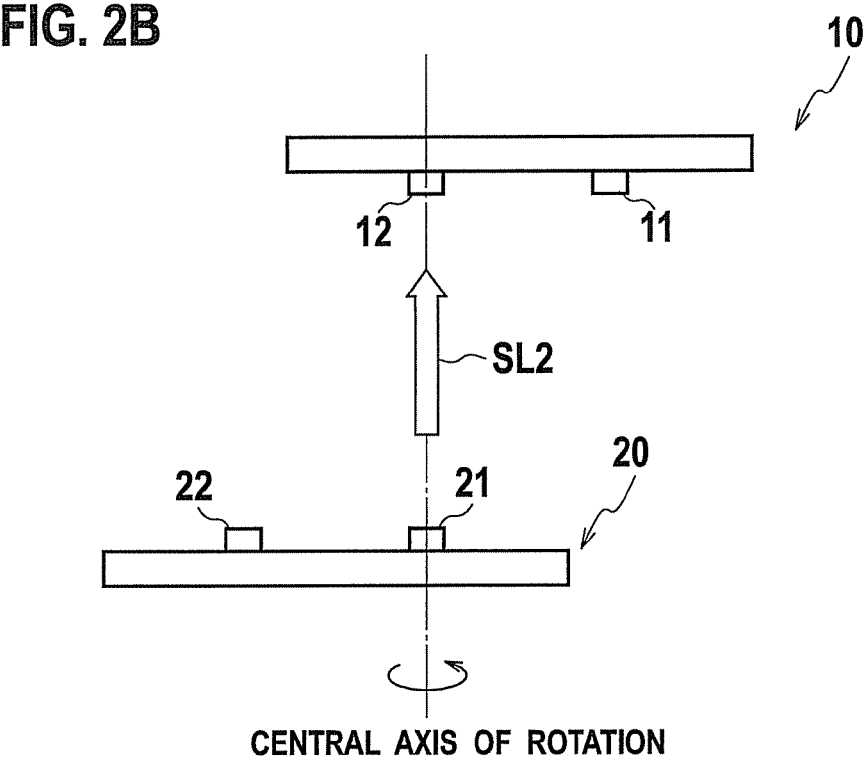
Figure 3:
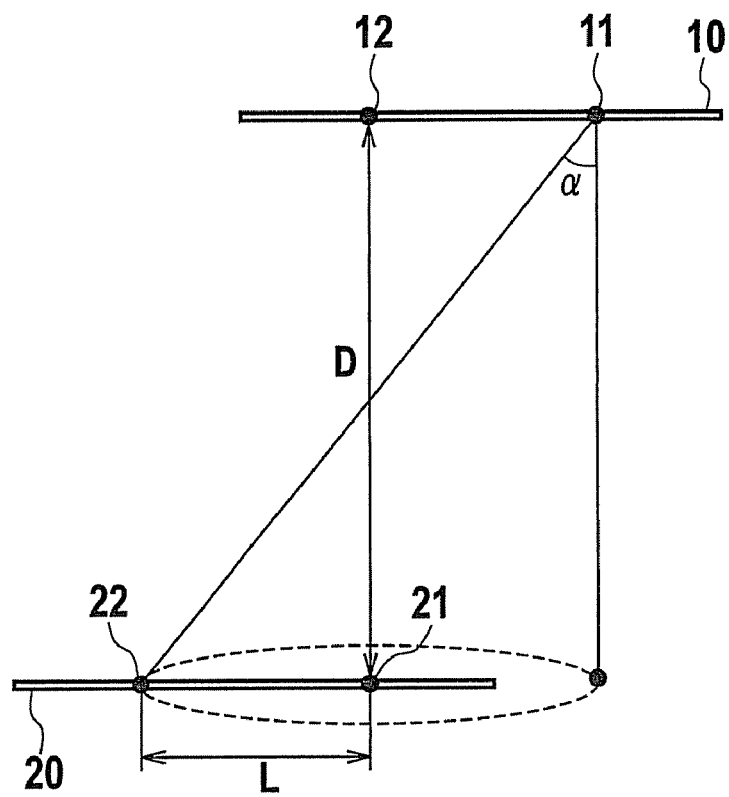
FIG. 3 is a schematic view for explaining conditions required for the first and second light emitting and receiving modules.

FIG. 1 is a block diagram showing a schematic configuration of a monitoring camera including an optical space transmission device according to an embodiment. FIGS. 2A and 2B are side views for explaining a relative positional relation between a first light emitting and receiving module 10 and a second light emitting and receiving module 20 constituting the optical space transmission device according to the embodiment. FIG. 3 is a schematic view for explaining conditions required for the first and second light emitting and receiving modules.

As shown in FIG. 1, a monitoring camera 1 includes: a fixed portion 2 which is fixed to a ceiling or the like; and a rotating section 3 which is rotationally connected to the fixed portion 2. The rotating portion 3 includes a camera mechanism 4 taking video and a rotation mechanism 5 rotating the rotating portion 3. The fixed portion 2 includes a controller 6 which outputs control signals to the camera and rotation mechanisms 4 and 5 of the rotating portion 3 to control the same. The fixed portion 2 is provided with a first light emitting and receiving module 10 constituting the optical space transmission device of the embodiment is attached, and the rotating portion 3 is provided with a second light emitting and receiving module 20 constituting the optical space transmission device of the embodiment.

The first and second light emitting and receiving modules 10 and 20 are communication modules to perform two-way space transmission between the fixed and rotating portions 2 and 3. Each of the first and second light emitting and receiving modules 10 and 20 includes light emitting and receiving elements. Specifically, the light emitting element of the first light emitting and receiving module 10 is a light emitting diode (LED) 11. The light emitting element of the second light emitting and receiving module 20 is a semiconductor laser (LD) 21. The light receiving element of the first light emitting and receiving module 10 is a photodiode (PD) 12 having enough sensitivity to wavelength of light emitted by the LD 21. The light receiving element of the second light emitting and receiving module 20 is a PD 22 having enough sensitivity to wavelength of light emitted by the LED 11.

The first light emitting and receiving module 10 includes an encoder 13, an LED driver 14, and a decoder 15. The encoder 13 encodes a control signal outputted from the controller 6. The LED driver 14 drives and controls the LED 11 based on the output of the encoder 13 to cause the LED 11 to emit a first signal light SL1 modulated according to the control signal from the controller 6. The decoder 15 decodes the outputted signal from the PD 12 into a video signal and outputs the same.

The second light emitting and receiving module 20 includes an encoder 23, an LED driver 24, and a decoder 25. The encoder 23 encodes a video signal of a monitoring image taken by an image sensor 4a of the camera mechanism 4. The LD driver 24 drives and controls the LD 21 based on the output of the encoder 23 to cause the LD 21 to emit second signal light SL2 modulated according to the video signal from the image sensor 4a. The decoder 25 decodes the outputted signal from the PD 22 into a control signal and outputs the same to the camera and rotation mechanisms 4 and 5.

In the monitoring camera 1 incorporating the optical space transmission device of the embodiment, to rotate the rotating portion 3, first, a control signal to operate the rotation mechanism 5 is outputted from the controller 6 of the fixed portion 2. The control signal outputted from the controller 6 is encoded by the encoder 13, which is mounted on the first light emitting and receiving module 10, and is supplied to the LED driver 14. The LED driver 14 drives and controls the LED 11 based on the control signal encoded by the encoder 13 to cause the LED 11 to emit the first signal light SL1 modulated according to the control signal. The first signal light. SL1 from the LED 11 is propagated in air between the fixed and rotating portions 2 and 3 and received by the PD 22 of the second light emitting and receiving module 20. The PD 22 of the second light emitting and receiving module 20 photoelectrically converts the received first signal light SL1 and outputs the same to the decoder 25. The decoder 25 decodes the signal outputted from the PD 22 according to the first signal light SL1 into the control signal and supplies the same to a rotation controller 5b of the rotation mechanism 5. The rotation controller 5b of the rotation mechanism 5 drives and controls an actuator 5a based on the control signal from the controller 6 which is transmitted from the fixed portion 2 to the rotating portion 3 through space. The rotating portion 3 is thus rotated according to control by the controller 6.

In the monitoring camera 1 including the optical space transmission device of the embodiment, to externally output the video signal of a monitoring image of the camera mechanism 4, first, the controller 6 of the fixed portion 2 outputs a control signal to operate the camera mechanism 4. The control signal outputted from the controller 6 is encoded by the encoder 13, which is mounted on the first light emitting and receiving module 10, and is supplied to the LED driver 14. The LED driver 14 drives and controls the LED 11 based on the control signal encoded by the encoder 13 to cause the LED 11 to emit the first signal light SL1 modulated according to the control signal. The first signal light SL1 from the LED 11 is propagated in air between the fixed and rotating portions 2 and 3 and received by the PD 22 of the second light emitting and receiving module 20. The PD 22 of the second light emitting and receiving module 20 photoelectrically converts the received first signal light SL1 and outputs a signal to the decoder 25. The decoder 25 decodes the signal outputted from the PD 22 according to the first signal light SL1 into the control signal and supplies the same to the camera controller 4b of the camera mechanism 4. The camera mechanism 4 of the camera controller 4b operates the image sensor 4a according to the control signal from the controller 6, which is transmitted from the fixed portion 2 to the rotating portion 3 through space, to take the monitoring image.

The video signal of the monitoring image taken by the camera mechanism 4 is encoded by the encoder 23, which is mounted on the second light emitting and receiving module 20, and a control signal outputted by the encoder 23 is supplied to the LD driver 24. The LD driver 24 drives and controls the LD 21 based on the control signal encoded by the encoder 23 to cause the LD 21 to emit the second signal light SL2 modulated according to the control signal. The second signal light SL2 from the LD 21 is propagated in air between the rotating and fixed portions 3 and 2 and is received by the PD 12 of the first light emitting and receiving module 10. The PD 12 of the first light emitting and receiving module 10 photoelectrically converts the received second signal light SL2 and outputs a signal to the decoder 15. The decoder 15 decodes the signal outputted from the PD 12 according to the second signal light SL2 into the video signal and outputs the same to the outside of the monitoring camera 1. The video signal of the monitoring image taken by the camera mechanism 4 is thus outputted to the outside.

As described above, in the optical space transmission device of the embodiment, the light emitting element of the first light emitting and receiving module 10 provided for the fixed portion 2 of the monitor camera 1 is the LED 11, which is comparatively cheep, and transmission of the control signal from the fixed portion 2 to the rotating portion 3 is performed through modulated light from the LED 11. In the space transmission of signals using light of the LED 11, the transmission speed is comparatively low but is high enough to transmit the control signal including data of small size. On the other hand, transmission of the video signal including data of large size needs to be high speed transmission. In the optical space transmission device of the embodiment, accordingly, the LD 21 is used as the light emitting element of the second light emitting and receiving module 20 provided for the rotating portion 3 of the monitoring camera 1, and transmission of the video signal from the rotating portion 3 to the fixed portion 2 is performed by modulated light from the LD 21. The LD 21 enables higher speed modulation than the LED 11. The transmission speed of the space transmission using light from the LD 21 is dramatically higher than that using light from the LED 11. By using light of the LD 21 for transmission of the video signal including data of large size, therefore, the video signal can be properly transmitted from the rotating portion 3 to the fixed portion 2 at real time.

Since the second light emitting and receiving module 20 is provided for the rotating portion 3 of the monitoring camera 1, when the second light emitting and receiving module 20 rotates with the rotation of the rotating portion 3, the relative positional relation between the second light emitting and receiving module 20 and the first light emitting and receiving module 10, which is provided for the fixed portion 2, changes. Herein, light of the LED 11 is divergent light. Accordingly, the first signal light SL1 from the LED 11 can be received by the PD2 even if the positional relation between the LED 11 and PD 22 is changed to some extent. On the other hand, light of the LD 21 is a laser beam with high directivity. The PD 12 therefore needs to be always positioned on an optical axis of the second signal light SL2 from the LD 21. Accordingly, when the positional relation between the LD 21 and the PD 12 is changed, the PD 22 cannot properly receive the second signal light SL2 from LD 21.

In the optical space transmission device of the embodiment, therefore, as shown in FIG. 2, the first and second light emitting and receiving modules 10 and 20 are respectively provided for the fixed and rotating portions 2 and 3 so that the optical axis of the second signal light SL2 coincides with a central axis of rotation of the rotating portion 3 relative to the fixed portion 2 and the PD 12 is always positioned on the optical axis of the second signal light SL2 from the LD 21. In other words, the position of the first light emitting and receiving module 10 relative to the fixed portion 2 is determined on the basis of the position of the PD 12 so that the PD 12 is positioned on the central axis of the rotation of the rotating portion 3 relative to the fixed portion 2. On the other hand, the installation position of the second light emitting and receiving module 20 is determined on the basis of the position of the LD 21 so that the LD 21 is positioned on the central axis of rotation of the rotating portion 3 relative to the fixed portion 2. The PD 12 can therefore always properly receive the second signal light SL2 from the LD 21 even if the relative positional relation between the first and second light emitting and receiving modules 10 and 20 changes with rotation of the rotating portion 3 like from FIG. 2A to FIG. 2B.

When the installation positions of the first and second light emitting and receiving modules 10 and 20 are determined so that the optical axis of the second signal light SL2 from the LD 21 coincides with the central axis of rotation of the rotating portion 3 relative to the fixed portion 2 as described above, the positional relation between the PD 22 and the LED 11 changes with the rotation of the rotating portion 3. However, since light from the LED 11 is divergent light as described above, the PD 22 can receive the first signal light SL1 from the LED 11 when the amount of change of the position of the PD 22 relative to the LED 11 is not more than an permissible value determined by an emission angle of the LED 11. In other words, the PD 22 cannot properly receive the first signal light SL1 from the LED 11 when the amount of change of the position of the PD 22 relative to the LED 11 with the rotation of the rotating portion 3 exceeds the permissible value.

In the optical space transmission device of the embodiment, therefore, an inter-module distance D, an inter-element distance L, and an emission angle $\alpha$ of the LED 11 of the first light emitting and receiving module 10 are individually determined so as to satisfy the relation: $\tan \alpha >= 2L/D$. Herein, the inter-module distance D is a distance between the first and second light emitting and receiving modules 10 and 20; and the inter-element distance L is a distance between the LD 21 and PD 22 of the second light emitting and receiving module 20 (between the LED 11 and PD 12 of the first light emitting and receiving module 10). The amount of change in position of the PD 22 relative to the LED 11 is therefore always not more than permissible value, and the PD 22 can always properly receive the first signal light SL1 from the LED 11. Desirably, the above values are set so that $\tan \alpha$ is as close as possible to $2L/D$ because an increase in emission angle $\alpha$ of the LED 11 increases an energy loss due to divergence accordingly to reduce the signal strength of the first signal light SL1. Herein, the inter-module distance D and inter-element distance L have limited adjustment because of structural limitation of the monitoring camera 1 or restriction in an element layout on a substrate, but the emission angle $\alpha$ of the LED 11 can be freely adjusted by optimizing lens shape or the like.

In the optical space transmission device of the embodiment, space transmission is performed at a comparatively short distance through two transmission systems between the first and second light emitting and receiving modules 10 and 20. Accordingly, there is concern that optical crosstalk occurs by an influence of reflection of the first and second signal light SL1 and SL2 and the like to make noise. Accordingly, to avoid such a problem, it is desirable that the first and second signal light SL1 and SL2 have wavelengths different from each other and the PD 22, which receives the first signal light SL1, and the PD 12, which receives the second signal light SL2, are optimized for wavelengths $\lambda 1$ and $\lambda 2$ of the first and second signal light SL1 and SL2.

Figure 4:
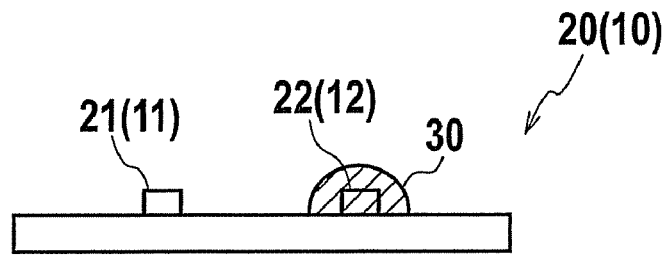
FIG. 4 is a view for explaining an example of wavelength selecting means.

Furthermore, it is effective to provide wavelength selecting means having a function of blocking light with the wavelength λ1, which is the wavelength of the second signal light SL2, for a light receiving surface of the PD 22, which receives the first signal light SL1, and provide wavelength selecting means having a function of blocking light with the wavelength λ2, which is the wavelength of the first signal light SL2, for a light receiving surface of the PD 12, which receives the second signal light SL1. An example of such wavelength selecting means can be resin 30 having a characteristic of cutting the wavelength λ1 of the first signal light SL1 (the wavelength λ2 of the second signal light SL2), the resin 30 being applied so as to cover the PD 22 (PD 12) as shown in FIG. 4. Another example thereof is a dielectric multilayer film having a characteristic of cutting the wavelength λ1 of the first signal light SL1 (the wavelength λ2 of the second signal light SL2), the dielectric multilayer film being formed on the PD 22 (PD 12). When the PD 22 itself is hardly sensitive to the wavelength λ1 of the first signal light SL1, it is unnecessary to provide the wavelength selecting means on the PD 22. When the PD 12 itself is hardly sensitive to the wavelength λ2 of the second signal light SL2, it is unnecessary to provide the wavelength selecting means on the PD 12.

Hereinafter, concrete examples of the optical space transmission device of the embodiment are shown.

EXAMPLE 1

First Light Emitting and Receiving Module 10
    LED 11; InGaAs LED
    λ1; 980 nm
    PD 12; GaAs PIN-type PD
(Second light emitting and receiving module 20)
    LD 21; GaAs VCSEL (surface emitting laser diode)
    λ1; 850 nm
    PD 22; Si PD
(Positional Relation)
    LD 21 and PD 12 were arranged on the central axis of rotation.
    Inter-module distance D; 20 mm
    Inter-element distance L; 17.3 mm
    Emission angle α of LED 11; 60°
(Countermeasure for Optical Crosstalk)
The material GaAs of the PD 12 has low enough sensitivity to wavelength of 980 nm. Resin mixed with dye having a cutoff wavelength of about 900 nm was applied to the PD 22 since the material Si of the PD 22 was sensitive to wavelength of 850 nm.

EXAMPLE 2

First Light Emitting and Receiving Module 10
    LED 11; GaAs LED
    λ1; 850 nm
    PD 12; Si PD
(Second light emitting and receiving module 20)
    LD 21; InGaAs VCSEL (surface emitting laser diode)
    λ1; 980 nm
    PD 22; GaAs PIN-type PD
(Positional Relation)
    LD 21 and PD 12 were arranged on the central axis of rotation.
    Inter-module distance D; 20 mm
    Inter-element distance L; 17.3 mm
    Emission angle α of LED 11; 60°
(Countermeasure for Optical Crosstalk)
The material GaAs of the PD 22 has low enough sensitivity to wavelength of 980 nm. Resin mixed with dye having a cutoff wavelength of about 900=m was applied to the PD 12 since the material Si of the PD 12 was sensitive to wavelength of 850 nm.

The optical space transmission device of the embodiment can be implemented by the structures shown in the above examples.

Hereinabove, as described in detail with the complete examples, according to the optical space transmission device of the embodiment, transmission of the control signal from the fixed portion 2 to the rotating portion 3 in the monitoring camera 1 uses the first signal light SL1 obtained by modulating light of the LED 11 according to the control signal while transmission of the video signal from the rotating portion 3 to the fixed portion 2 uses the second signal light SL2 obtained by modulating light of the LD 21 according to the video signal. It is therefore possible to efficiently and properly perform two-way signal transmission between the fixed portion 2 and rotating portion 3 of the camera 1 in which high speed transmission is required in one way.

OTHER EMBODIMENTS

As described above, the present invention is described using the embodiment but should not be understood that the description and drawings constituting a part of this disclosure limit the invention. From this disclosure, those skilled in the art will know various alternative embodiments, examples, and operational technologies. For example, the optical space transmission device of the present invention is not limited to the application to the aforementioned monitoring camera 1 and is effectively applicable to every device which includes two or more members connected to each other through a rotation mechanism and is characterized in which two-way signal transmission is required between the members and high speed transmission is required in one way.

In this way, it is obvious that the present invention includes various examples and the like not described here. Accordingly, the technical scope of the present invention is specified by the following proper claims from the above description.

What is claimed is:

1. An optical space transmission device comprising:
    a first portion; and
    a second portion which is rotatably connected to the first portion and performs space transmission of signals using light between the first portion and the second portion, wherein the device comprises:
    a first light emitting and receiving module which is provided for the first portion and includes: a first light emitting element composed of a light emitting diode emitting first signal light modulated based on a signal transmitted from the first to second portion; and a first light receiving element receiving second signal light modulated based on a signal transmitted from the second to first portions; and
    a second light emitting and receiving module which is provided for the second portion and includes: a second light emitting element composed of a semiconductor laser emitting the second signal light; and a second light receiving element receiving the first signal light;
    wherein an optical axis of the second signal light coincides with a central axis of rotation of the second portion relative to the first portion; and
    the second portion rotates around the optical axis of the second signal light.

2. The device of claim 1, wherein
    wavelength of the first signal light is different from wavelength of the second signal light.

3. The device of claim 2, further comprising:
a wavelength selection unit which has a function to block light with wavelength of the first signal light and is provided on a light receiving surface of the first light receiving element.

4. The device of claim 3, wherein
the wavelength selecting unit contains resin.

5. The device of claim 4, wherein
the resin constituting the wavelength selecting unit contains dye.

6. The device of claim 3, wherein
the wavelength selecting unit includes a dielectric multi-layer film.

7. The device of claim 3, wherein
the wavelength of the first signal light is shorter than the wavelength of the second signal light.

8. The device of claim 2, further comprising
a wavelength selection unit which has a function to block light with wavelength of the second signal light and is provided on a light receiving surface of the second light receiving element.

9. The device of claim 8, wherein
the wavelength selecting unit contains resin.

10. The device of claim 9, wherein
the resin constituting the wavelength selecting unit contains dye.

11. The device of claim 8, wherein
the wavelength selecting unit contains a dielectric multi-layer film.

12. The device of claim 8, wherein
the wavelength of the first signal light is longer than the wavelength of the second signal light.

13. The device of claim 1, wherein
a relation $\tan \alpha >= 2L/D$ is satisfied where D indicates an inter-module distance between the first and second light emitting and receiving modules; L indicates an inter-element distance between the second light emitting and receiving elements; and $\alpha$ indicates an emission angle of the first light emitting element composed of the light emitting diode.

14. The device of claim 1, wherein
the device is an imaging device including: a video imaging section in the second portion;
and a controller controlling the video imaging section for the first portion,
the transmitted signal from the first to second portions is a control signal, and
the transmitted signal from the second to first portions is a video signal.

15. The device of claim 1, wherein
the device is an imaging device including: a video imaging section in the second portion;
and a controller controlling the video imaging section for the first portion,
the transmitted signal from the first to second portions is a control signal, and
the transmitted signal from the second to first portions is a video signal.

16. The device of claim 15, wherein
the second portion includes a rotation mechanism rotating the second portion relative to the first portion.

* * * * *